(12) United States Patent
Yang

(10) Patent No.: US 9,379,816 B2
(45) Date of Patent: Jun. 28, 2016

(54) TRANSCEIVERS WITH CONFIGURABLE INTEGRATED CIRCUIT

(75) Inventor: Yunfa Yang, San Ramon, CA (US)

(73) Assignee: Gigamon Inc., Santa Clara, CA (US)

( * ) Notice: Subject to any disclaimer, the term of this patent is extended or adjusted under 35 U.S.C. 154(b) by 740 days.

(21) Appl. No.: 13/247,662

(22) Filed: Sep. 28, 2011

(65) Prior Publication Data

US 2013/0077968 A1    Mar. 28, 2013

(51) Int. Cl.
*H04B 10/00* (2013.01)
*H04B 10/40* (2013.01)

(52) U.S. Cl.
CPC .................................. *H04B 10/40* (2013.01)

(58) Field of Classification Search
CPC ................................................. H04B 10/40
USPC .................................................. 398/135–214
See application file for complete search history.

(56) References Cited

U.S. PATENT DOCUMENTS

| 7,424,018 | B2 | 9/2008 | Gallatin et al. | |
|---|---|---|---|---|
| 7,436,832 | B2 | 10/2008 | Gallatin et al. | |
| 7,440,467 | B2 | 10/2008 | Gallatin et al. | |
| 7,586,854 | B2 * | 9/2009 | Megarity | H04L 41/0813 370/254 |
| 7,792,047 | B2 | 9/2010 | Gallatin et al. | |
| 8,315,256 | B2 | 11/2012 | Leong et al. | |
| 8,504,882 | B2 * | 8/2013 | Li | G06F 11/267 375/226 |
| 2002/0063924 | A1 * | 5/2002 | Kimbrough | H04B 10/272 398/79 |
| 2002/0196501 | A1 * | 12/2002 | Buss et al. | 359/152 |
| 2003/0215243 | A1 * | 11/2003 | Booth | H04B 10/806 398/135 |
| 2008/0310850 | A1 * | 12/2008 | Pederson | G07C 9/00158 398/135 |
| 2009/0022493 | A1 * | 1/2009 | Lu | H04Q 11/0067 398/58 |
| 2011/0142443 | A1 * | 6/2011 | Hirth | H04J 3/1694 398/25 |
| 2011/0182588 | A1 * | 7/2011 | Wojtowicz | H04B 10/40 398/139 |
| 2011/0255866 | A1 * | 10/2011 | Van Veen | H04B 10/07955 398/35 |
| 2012/0082463 | A1 * | 4/2012 | Kasprzyk | H04B 10/40 398/140 |
| 2013/0077968 | A1 * | 3/2013 | Yang | H04B 10/40 398/45 |
| 2013/0202300 | A1 * | 8/2013 | Dvir | H04Q 11/0066 398/58 |

* cited by examiner

*Primary Examiner* — Danny Leung
(74) *Attorney, Agent, or Firm* — Perkins Coie LLP

(57) ABSTRACT

A transceiver includes a housing, an optical interface for detachably coupling to an optical transmission device, an optical-electrical conversion unit coupled to the optical interface, the optical-electrical conversion unit located in the housing, a programmable logic device communicatively coupled to the optical-electrical conversion unit, and an electrical interface communicatively coupled to the programmable logic device, wherein the electrical interface is configured for detachably coupling to an electrical transmission device. In some embodiments, the programmable logic device may be configured to perform packet filtering, packet slicing, time stamping, packet analysis, port labeling, packet masking, packet modification, packet stripping, packet de-duplication, or a combination thereof.

22 Claims, 6 Drawing Sheets

US 9,379,816 B2

TRANSCEIVERS WITH CONFIGURABLE INTEGRATED CIRCUIT

FIELD

This application relates generally to network switch devices.

BACKGROUND

Network switches have been used to forward packets from one node to another node. Such network switch devices include a first network port for receiving packets from a first node, and a second network port for passing the packets to a second node.

Sometimes, a network switch device may receive packets optically. In such cases, the network switch device may include a transceiver for performing optical-electrical conversion. In one mode of operation, the transceiver may receive the packets optically in the form of light signals, and covert the light signals into electrical signals for transmission downstream. In a reverse mode of operation, the transceiver may receive the packets in the form of electrical signals, and convert the electrical signals into light signals for optical transmission downstream. Applicant of the subject application has determined that it would be desirable to provide a transceiver that includes a configurable processor.

Applicant of the subject application has also determined that packet switch devices (appliances) can be used to forward a copy of packets (e.g., obtained through a SPAN port of a switch or router, or by making a copy of each packet through its built-in tap modules) in the packet-switching network, to network monitoring or security tools for analysis thereby. Such packet switch appliances may have one or more network ports for connection to the packet-switching network and one or more instrument ports connected to one or more network instruments for monitoring packet traffic, such as packet sniffers, intrusion detection systems, application monitors, or forensic recorders.

SUMMARY

In accordance with some embodiments, a transceiver includes a housing, an optical interface for detachably coupling to an optical transmission device, an optical-electrical conversion unit coupled to the optical interface, the optical-electrical conversion unit located in the housing, a programmable logic device communicatively coupled to the optical-electrical conversion unit, and an electrical interface communicatively coupled to the programmable logic device, wherein the electrical interface is configured for detachably coupling to an electrical transmission device.

In accordance with other embodiments, a transceiver includes an optical interface for detachably coupling to an optical transmission device, an optical-electrical conversion unit coupled to the optical interface, a configurable processor communicatively coupled to the optical-electrical conversion unit, wherein the configurable processor is configured to perform packet filtering, packet slicing, time stamping, packet analysis, port labeling, packet masking, packet modification, packet stripping, packet de-duplication, or a combination thereof, and an electrical interface communicatively coupled to the configurable processor, wherein the electrical interface is configured for detachably coupling to an electrical transmission device.

In accordance with other embodiments, a network switch apparatus includes a network switch housing, a first network port, a second network port, a first instrument port configured to communicate with a monitoring tool, and a circuit inside the network switch housing, wherein the circuit is configured to receive packets from the first network port, and pass at least some of the packets from the first network port to the first instrument port, wherein the circuit includes a transceiver located in the network switch housing, and wherein the transceiver includes a configurable processor, and is configured to be detachably coupled to a remaining part of the circuit.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
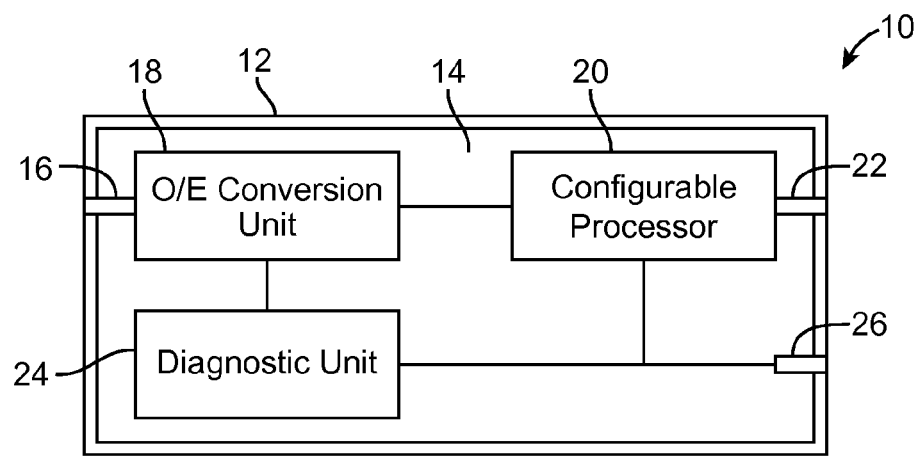
FIG. 1 illustrates a transceiver in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a transceiver 10 in accordance with some embodiments. As used in this specification, the term "transceiver" refers to any device that has both transmission and receiving capabilities, wherein such transmission and receiving capabilities may be implemented using one or more components that are combined to share common circuitry, or that share a single housing. The transceiver 10 includes a housing 12 containing a substrate 14 on which one or more components of the transceiver 10 may be coupled and/or supported. The housing 12 may be implemented using one or more components. Also, in some embodiments, the substrate 14 may be considered to be a part of the housing. The substrate 14 may be an electrical substrate in some embodiments, wherein the electrical substrate includes one or more electrical conductors for electrically connecting different components of the transceiver 10. In some embodiments, the transceiver 10 may have a dimension (e.g., width, thickness, and/or longitudinal length) that is similar to that of a commercially available transceiver. Such feature allows an existing transceiver to be replaced with the transceiver 10 without changing a floorplan of the circuitry on which the transceiver is used. In other embodiments, the transceiver 10 may have other dimensions, which may be different from those in commercially available transceivers. It should be noted that as used in this specification, the term "housing" is not necessarily limited to a single device that contains all of the components on the substrate 14 of the transceiver 10, and may refer to one or more components on the substrate 14 that define the exterior profile of the transceiver 10.

As shown in the illustrated embodiments, the transceiver 10 also includes an optical port 16, an optical-electrical conversion unit 18 coupled to the optical port 16, a configurable processor 20 coupled to the optical-electrical conversion unit 18, and an electrical port 22 coupled to the configurable processor 20. The optical port 16 is configured to couple to an optical device, such as an optical waveguide (e.g., a fiber optic). In some embodiments, the optical port 16 is configured to detachably couple to the optical device, thereby allowing the transceiver 10 to be detachably coupled to such optical device. Also, in some embodiments, the transceiver 10 may be detachably coupled to a network switch device, and the optical port 16 of the transceiver 10 is then configured to detachably couple to a fiber optic, thereby allowing the network switch device to receive optical signals from the fiber optic through the optical port 16 of the transceiver 10. In further embodiments, the network switch device may include a fiber optic, wherein when the transceiver 10 is used with the network switch device, the transceiver 10 is detachably coupled to the fiber optic in the network switch device.

The optical-electrical conversion unit 18 is configured to convert optical signals received from the optical port 16 into electrical signals, and/or vice versa. The configurable processor 20 is configured to receive packets in the form of electrical signals from the optical-electrical conversion unit 18, process the packets, and transmit the packets downstream to the electrical port 22. As discussed, in some embodiments, the transceiver 10 may be used in a network switch device. In such cases, the electrical port 22 is communicatively coupled to a component of the network switch device, and the configurable processor 20 is configured to transmit the packets to the component of the network switch device through the electrical port 22. Alternatively, or additionally, the port 22 may receive information from the component of the network switch device during use, and pass the information to the configurable processor 20. The processor 20 processes the information, and output the information to the optical-electrical conversion unit 18. The optical-electrical conversion unit 18 converts the information from digital form to optical form, and passes the information in the form of optical signals to the optical port 16.

The configurable processor 20 may be any processor 20 that is capable of being configured (e.g., programmed). In some embodiments, the configurable processor 20 may a programmable logic device (PLD), such as a complex programmable logic device (CPLD), an erasable programmable logic device (EPLD) a field programmable gate array (FPGA), etc. Also, in some embodiments, the configurable processor 20 may be implemented using more than one processors, such as a plurality of PLDs (e.g., a plurality of CPLDs, a plurality of EPLDs, a plurality of FPGAs, etc.). A CPLD is a programmable logic device with complexity between that of PALs and FPGAs, and architectural features of both. In some cases, the building block of a CPLD includes macrocell, which contains logic implementing disjunctive normal form expressions and more specialized logic operations. An EPLD is an integrated circuit that includes an array of programmable logic devices (PLD). In some cases, the PLDs do not come pre-connected, and the connections are programmed electrically by a user.

A FPGA is an integrated circuit that is configurable by the customer or designer after manufacturing. A FPGA may be used to implement any logical function. The ability for a user of the FPGA device to update functionality after shipping, and/or to partially reconfigure a portion of the design, and the low non-recurring engineering costs relative to an ASIC design, offer advantages for many applications. A FPGA may contain programmable logic components ("logic blocks"), and a hierarchy of reconfigurable interconnects that allow the blocks to be wired together in accordance with any user-specified configurations. In some embodiments, the logic blocks may be configured to perform complex combinational functions. In other embodiments, the logic blocks may be configured to perform simple logic gates, like AND and XOR. In some embodiments, logic blocks of an FPGA may also include memory elements, which may be simple flip-flops or more complete blocks of memory.

In other embodiments, the configurable processor 20 may be implemented using a microprocessor, a microcontroller, a network processor, etc.

As shown in the illustrated embodiments, the transceiver 10 also includes a digital diagnostic unit 24, which may be communicatively coupled to the optical-electrical conversion unit 18 and/or the configurable processor 20. The transceiver 10 also includes a port 26 communicatively coupled to the digital diagnostic unit 24 and/or the configurable processor 20. The digital diagnostic unit 24 is configured to detect certain condition(s), and transmit a signal to the port 26 for reporting in response to a detected condition. In some embodiments, the diagnostic unit 24 may include functionalities defined by multi-sourcing agreement (MSA). Also, in some embodiments, all management of the transceiver 10 (or management of the device used with the transceiver 10) may be implemented through the port 26. By means of non-limiting examples, the port 26 may be used to set time and date, enable/disable the transceiver 10, check status, etc. In addition, in some embodiments, the port 26 and the processor 20 and/or the diagnostic unit 24 may be configured to implement a diagnostic monitoring interface (DDMI) that is compliant to MSA. In such cases, the port 26 may include an I20 interface. In some embodiments, the port 26 may be communicatively coupled to a user interface, which allows a user to receive information regarding detected condition(s) at the transceiver 10. In some embodiments, the communicatively coupling between the user interface and the transceiver 10 may be accomplished by directly connecting the user interface to the transceiver 10. In other embodiments, the communicatively coupling may be accomplished remotely, wherein the user interface may be communicatively coupled to the transceiver 10 through a network (e.g., the Internet). By means of non-limiting examples, the detected condition(s) by the transceiver 10 may be one or more of a signal lost (e.g., when the transceiver 10 detects that there is no input signal), a transmit fault (e.g., output by a component of the transceiver 10 is incorrect), over heating of the transceiver, etc. Also, in some embodiments, part of the process to detect the condition(s) may be performed using the configurable processor 20.

In some embodiments, the digital diagnostic unit 24 may include non-transitory memory for storing information regarding a processing of packets received at the transceiver 10, and a controller for analyzing the packets. Also, in some embodiments, the digital diagnostic unit 24 may be implemented using a processor, such as a configurable processor. In other embodiments, the digital diagnostic unit 24 may be implemented using the configurable processor 20. In such cases, the digital diagnostic unit 24 may be considered to be a part of the configurable processor 20. In further embodiments, the transceiver 10 may not include any digital diagnostic unit 24.

Also, in some embodiments, the port 26 of the transceiver 10 may be used to configure the configurable processor 20. For example, the port 26 of the transceiver 10 may be communicatively coupled to a user interface (e.g., a computer), which may be used by a user to configure (e.g., program) the configurable processor 20. In some embodiments, the communicatively coupling between the user interface and the transceiver 10 may be accomplished by directly connecting the user interface to the transceiver 10. In other embodiments, the communicatively coupling may be accomplished remotely, wherein the user interface may be communicatively coupled to the transceiver 10 through a network (e.g., the Internet).

It should be noted that the port 26 may include one or more channels (ports). Also, in some embodiments, the port 26 may interface the transceiver 10 with a system CPU. For example, in some embodiments, port 26 may be provide a control channel between the configurable processor 20 and a system CPU (e.g., a CPU of a device, such as a network switch, which includes the transceiver 10). In such cases, configuration commands, configuration setting, packet processing status, synchronization status, etc., may be implemented through this interface. For example, in some embodiments, for time stamping, time of day may be set and tuned by the system CPU through the port 26 (interface). In other embodiments, the system CPU may access the registers (in the embodiments in which processor 20 is a FPGA) inside the configurable processor 20 through the port 26. In further embodiments, the system CPU may check and/or set application type (e.g., time stamping, slicing, etc.) through port 26. In still other embodiments, the system CPU may turn on/off the configurable processor 20 and/or the transceiver 10 through the port 26. In still further embodiments, the system CPU may upgrade processor/FPGA images in the field through port 26. In other embodiments, the configurable processor 20 may report certain detected conditions (events) to the system CPU through port 26. In further embodiments, the system CPU may configure data channel types and/or speed through port 26.

In the illustrated embodiments, the optical port 16 and the electrical port 22 are located on opposite ends of the transceiver 10. In other embodiments, the optical port 16 and the electrical port 22 may be located at a same end of the transceiver 10. In such cases, the configurable processor 20 may be located at an end that is opposite from the end wherein the optical port 16 and the electrical port 22 are located. Such configuration may allow the configurable processor 20 to dissipate heat more efficiently. In further embodiments, the optical port 16 and/or the electrical port 22 may be located at other locations at the transceiver 10. For example, in other embodiments, the optical port 16 and/or the electrical port 22 may be located at a longitudinal side of the transceiver 10.

Figure 2:
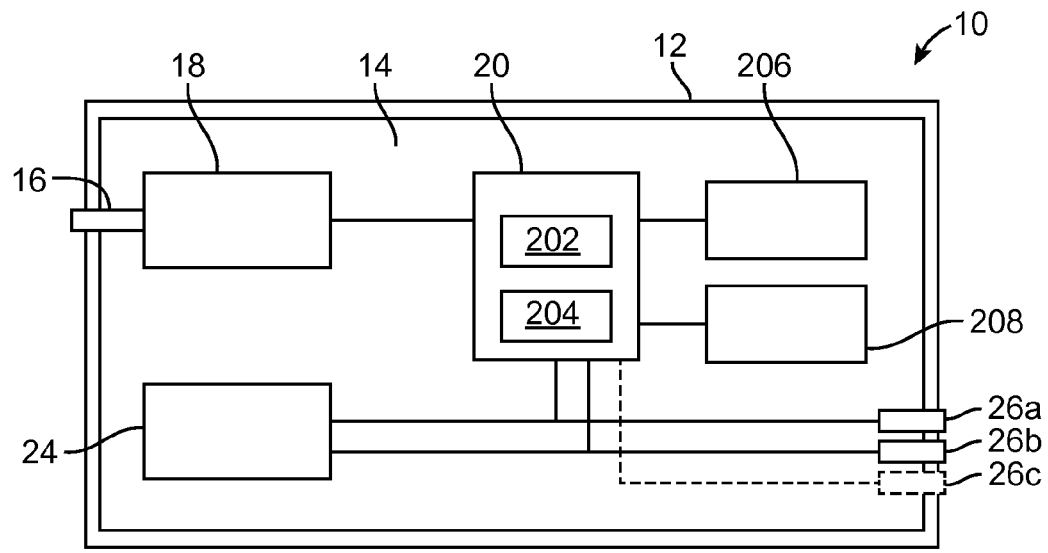
FIG. 2 illustrates a transceiver in accordance with other embodiments.

It should be noted that the transceiver 10 is not limited to the configuration described, and that the transceiver 10 may have other configurations in other embodiments. For example, in other embodiments, the transceiver 10 may include additional components. FIG. 2 illustrates a variation of the transceiver 10 of FIG. 1 in accordance with some embodiments. The transceiver 10 of FIG. 2 is the same as that in FIG. 1, except that the configurable processor 20 includes a clock recovery unit 202, and a memory 204. Also, the transceiver 10 may optionally further include a local clock 206, and a power management unit 208. In the illustrated embodiments, the local clock 206 is configured to provide a reference clock signal to the configurable processor 20. The clock recovery unit 202 of the configurable processor 20, receives the clock signal from the local clock 206, and is configured to perform time-stamping for packets received at the transceiver 10. The memory 204 (which may be considered an example of a non-transitory medium) is configured to store information associated with processing of packets received at the transceiver 10. By means of non-limiting examples, the memory 204 may be configured to store FPGA image, processor boot loader, application image, information regarding the transceiver (such as type of transceiver, application for the transceiver, etc.), and any combination thereof.

The power management unit 208 is configured to deactivate the transceiver 10 in response to a detection of certain predetermined condition(s). By means of non-limiting examples, the predetermined condition(s) may be one or more of a signal lost (e.g., when the transceiver 10 detects that there is no input signal), a transmit fault (e.g., output by a component of the transceiver 10 is incorrect), over heating of the transceiver, etc. In the illustrated embodiments, the management unit 208 is communicatively coupled to the configurable processor 20. In such cases, the power management unit 208 is configured to deactivate the transceiver 10 in response to a detection of certain predetermined condition(s) by the configurable processor 20. In other embodiments, the management unit 208 may be communicatively coupled to the digital diagnostic unit 24. In such cases, the power management unit 208 is configured to deactivate the transceiver 10 in response to a detection of certain predetermined condition(s) by the digital diagnostic unit 24. In further embodiments, the management unit 208 may be communicatively coupled to both the configurable processor 20 and the digital diagnostic unit 24. In such cases, the power management unit 208 is configured to deactivate the transceiver 10 in response to a detection of certain predetermined condition(s) by the digital diagnostic unit 24 and/or the configurable processor 20.

As shown in the illustrated embodiments of FIG. 2, the port 26 of the transceiver 10 includes a configuration port 26a configured to allow a user to configure (e.g., program) the configurable processor 20. The configuration port 26a may be communicatively coupled to the digital diagnostic unit 24 and/or the configurable processor 20 via one or more electrical conductors, and/or one or more circuitry. In some embodiments, during use, the configuration port 26a receives programming instructions from a user, and may pass the programming instructions to the digital diagnostic unit 24 and/or the configurable processor 20 to program one or both of these components.

In other embodiments, the configuration port 26a may receive commands from a user, and may pass the commands to the digital diagnostic 24 and/or the configurable processor 20. By means of non-limiting examples, the command may be a command to retrieve information (such as synchronization status, processor running log, etc.), a command to activate or deactivate a function of the transceiver 10, or a command to manipulate packet(s)(e.g., to transmit packet(s) to a particular port, to remove part(s) of a packet, to add information to a packet, etc.).

The port 26 of the transceiver 10 may optionally also include an output port 26b configured to report a certain detected condition to a monitoring device. The output port 26b is communicatively coupled to the digital diagnostic unit 24 and/or the configurable processor 20. In some embodiments, the digital diagnostic unit 24 and/or the configurable processor 20 may be configured to detect certain condition(s), such as, signal lost, over heating of the transceiver 10, transmission fault (e.g., incorrect output), and generate a reporting signal in response to a detection to one or more of these detected conditions. The reporting signal is transmitted to the output port 26b, which output the reporting signal to a monitoring device that is communicatively coupled to the output port 26b. Also, in some embodiments, the digital diagnostic unit 24 and/or the configurable processor 20 may be configured to detect a voltage for monitoring quality of power supply.

The port 26 of the transceiver 10 may also optionally include an input port 26c for receiving signals from an external clock (which may be a real clock in some embodiments). In such cases, the transceiver 10 may not include the local clock 206. In some embodiments, the external clock may be a 1 pulse per second clock, or any other frequency clocks. During use, the transceiver 10 may receive clock signals from the external clock through the port 26c, and use the clock signals to time stamp packets that are received at the transceiver 10.

In one or more embodiments, any of the ports 26a-26c may be combined.

In some embodiments, the transceiver 10 may be implemented as a small form-factor pluggable (SFP) transceiver for telecommunication and/or data communications applications. Also, in some embodiments, the SFP may be compliant to multi-sourcing agreement (MSA). In other embodiments, the transceiver 10 may be implemented as an enhanced small form-factor pluggable (SFP+) transceiver. In further embodiments, the transceiver 10 may be implemented as any pluggable form factor, including but not limited to XFP, QSFP, CFP, SFF, XENPAK, etc. In some embodiments, the transceiver 10 may interface a network device mother board (for a switch, router, media converter or similar device) to a fiber optic or copper networking cable. The transceiver 10 may have a plurality of pins (e.g., 20 pins or more) in some embodiments.

The transceiver 10 may have different configurations for supporting different applications in different embodiments, including but not limited to Ethernet, telecommunication, Infiniband, fiber channel, etc. Also, the transceiver 10 may be configured to support any speed of communication, such as 10/100/1000 Ethernet, 10GE, 40/100GE and higher, 003/0012/0048/00192 and higher SONET; 1G/2G/4G/8G/10G/16G and higher fiber channel; 2G/5G/10G and higher Infiniband, etc.

Figure 3A:
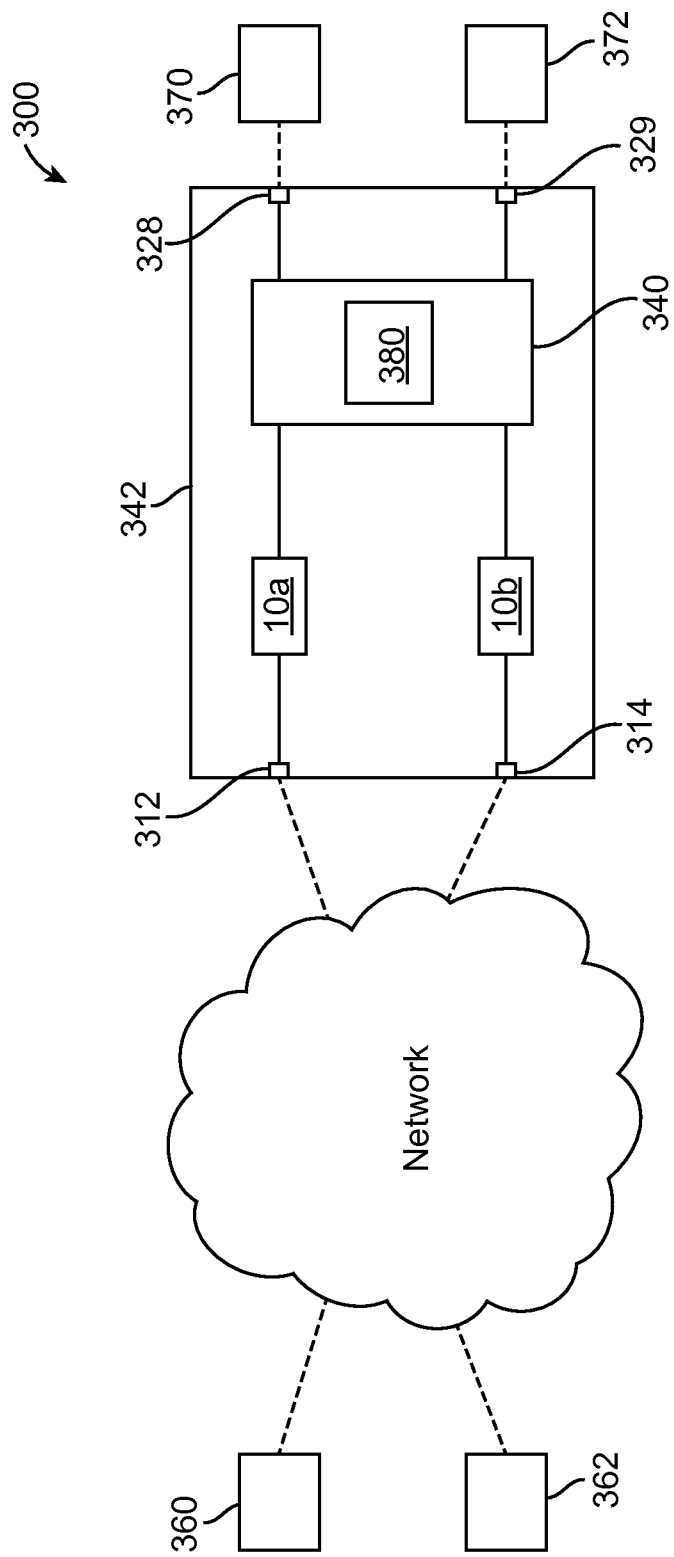
FIG. 3A illustrates a packet switch device in accordance with some embodiments.

The transceiver 10 may be used in any communication devices. For example, in some embodiments, the transceiver 10 may be included as a component of a network switch device. FIG. 3A illustrates a network switch device 300 that includes the transceiver 10 in accordance with some embodiments. The network switch device 300 includes a first network port 312, a second network port 314, a first instrument port 328, and a second instrument port 329. The device 300 also includes a packet switch 340, and a network switch housing 342 for containing the packet switch 340. The packet switch 340 also includes a processor 380 (which may be a network processor in some embodiments) for performing packet processing. In the illustrated embodiments, the integrated circuit 380 is illustrated as a component of the packet switch 340. In other embodiments, the integrated circuit 380 may be a separate component from the packet switch 340. The integrated circuit 380 may be implemented using a processor, such as a general processor, a network processor, an ASIC processor, a FPGA processor, etc. Also, in some embodiments, the same processor that is used to implement the packet switch 340 may also be used to implement functionalities of the integrated circuit 380.

In the illustrated embodiments, the device 300 also includes two optical transceivers 10a, 10b coupled to each of the respective ports 312, 314. The optical devices 10a, 10b are configured to connect a link layer device to a physical medium such as an optical fiber. The housing 342 allows the device 300 to be carried, transported, sold, and/or operated as a single unit. The ports 312, 314, 328, 329 are located at a periphery of the housing 342. In other embodiments, the ports 312, 314, 328, 329 may be located at other locations relative to the housing 342. Although two network ports 312, 314 are shown, in other embodiments, the device 300 may include more than two network ports. Also, although two instrument ports 328, 329 are shown, in other embodiments, the device 300 may include only one instrument port, or more than two instrument ports.

During use, the first network port 312 of the device 300 is communicatively coupled to a first node 360, and the second port 314 is communicatively coupled to a second node 362. The device 300 is configured to communicate packets between the first and second nodes 360, 362 via the network ports 312, 314. Also, during use, the instrument ports 328, 329 of the device 300 are communicatively coupled to respective instruments 370, 372. The instruments 370, 372 may be directly coupled to the device 300, or communicatively coupled to the device 300 through the network (e.g., Internet). In some cases, the device 300 is provided as a single unit that allows the device 300 to be deployed at a single point along a communication path.

In the illustrated embodiments, the transceivers 10a, 10b are detachably coupled to a substrate in the network switch device 300. When connected, the respective optical ports 16 of the transceivers 10a, 10b are coupled to respective optical wave guides (e.g., fiber optics) in the network switch device 300, and the respective electrical ports 22 of the transceivers 10a, 10b are connected to respective electrical conductors in the network switch device 300. One or both of the transceivers 10a, 10b may be configured to perform packet processing, including but not limited to packet filtering, packet slicing, time stamping, packet analysis, port labeling, packet masking, packet modification, packet stripping, packet de-duplication, or a combination thereof. During use, the device 300 may receive packets from the network port 312. The transceiver 10a then processes the received packets, and passes the packets to the network switch 340 for further processing. The device 300 may also receive packets from the network port 314. In such cases, the transceiver 10b then processes the received packets, and passes the packets to the network switch 340 for further processing. In the illustrated embodiments, the packet switch 340 is configured to receive packets from nodes 360, 362 via the network ports 312, 314 and the transceivers 10a, 10b, and process the packets in accordance with a predefined scheme. For example, the packet switch 340 may pass packets received from one or more nodes to one or more instruments that are connected to respective instrument port(s) 328, 329. In some embodiments, the transceivers 10a, 10b may be considered to be a part of the network switch 340.

In any of the embodiments, the packet switch 340 may be any switch module that provides packet transmission in accordance with a pre-determined transmission scheme. In some embodiments, the packet switch 340 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 300 after the packets have been processed), such as an intrusion prevention system. In other embodiments, the packet switch 340 may be configured such that the packets may be transmitted in a one-to-many configuration (i.e., from one network port to multiple instrument ports). In other embodiments, the packet switch 340 may be configured such that the packets may be transmitted in a many-to-many configuration (i.e., from multiple network ports to multiple instrument ports). In further embodiments, the packet switch 340 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 300 so that the packets (or certain types of packets) are routed according to any one of these configurations. In some embodiments, the packet movement configuration is predetermined such that when the device 300 receives the packets, the device 300 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 340 that may be used to implement features described herein include any of the commercially available network switch devices, such as GigaVUE™, that is available at Gigamon LLC. Other examples of packet switch 340 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 340 may have the functionalities of a conventional packet switch except that it provides visibility into various parts of a network. Thus, embodiments of the packet switch 340 may operate like a conventional managed packet switch, but providing packet monitoring function. This is accomplished by configuring the packet switch 340 to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch 340 that may be used with the device 300 is not limited to the examples described above, and that other packet switches 340 with different configurations may be used as well. Also, in any of the embodiments described herein, the packet switch 340 may be implemented using an integrated circuit, such as a processor (e.g., a general purpose processor, a network processor, an ASIC processor, a FPGA processor, etc.).

Also, in some embodiments, any of the functionalities described with reference to the packet switches 340 may be performed by the transceiver 10. For example, in some embodiments, the configurable processor 20 at the transceiver 10 may be configured to perform packet de-duplication. In some cases, the device 300 may receive packets that are duplicates via the span ports of the two nodes 360 and 362. In such cases, the transceiver 10 (e.g., transceiver 10*a*, or 10*b*) is configured to perform packet de-duplication to remove the duplicate(s) before forwarding the packet to the packet switch 34, or to the instrument 370 and/or instrument 372. In another example, the configurable processor 20 at the transceiver 10 may be configured to perform packet transmission in accordance with a predetermined packet movement configuration, such as a one-to-one, one-to-many, many-to-one, or a many-to-many configuration, as similarly described herein.

As illustrated in the above embodiments, the transceiver 10 with the configurable processor 20 is advantageous because it allows a user to selectively configure the processor 20 without changing a floorplan of circuitry in the network switch device 300. For example, in some cases, if a user wishes to add a functionality to the network switch device 300, the user may simply program the configurable processor 20 (e.g., remotely through a copper cable or a fiber optic). Such technique obviates the need to redesign the circuitry (e.g., the mother board) in the network switch device 300. Also, the transceiver 10 with the configurable processor 20 is advantageous because it may allow an existing transceiver that does not have any configurable processor to be replaced with the transceiver 10 with the configurable processor 20. For example, a user may remove an existing transceiver from a network switch device, and replace it with the transceiver 10 with the configurable processor 20. This allows additional functionalities to be provided for the network switch device through the processor 20 at the transceiver 10.

As discussed, the configurable processor 20 at the transceiver 10 may be configured to perform packet de-duplication in some embodiments. In such cases, when the configurable processor 20 determines that the packet is a duplicate packet, then the configurable processor 20 will prevent the packet from being transmitted to the instrument ports 328, 329 and/or the second network port 314. For example, the configurable processor 20 at the transceiver 10 may be configured to drop the duplicate packet. In some embodiments, the configurable processor 20 at the transceiver 10 is configured to first check the IPID field in the header against another IPID field in another header of an earlier received packet before other fields. This feature is advantageous because the value of the IPID field has the highest change rate statistically (i.e., it changes more frequently) from packet to packet compared to other fields. Thus, if two packets have the same IPID field value, then there is a high chance that one of the two packets is a duplicate packet. In some embodiments, the configurable processor 20 is configured to check the IPID field by determining an identification value for the identification field in the header of the received packet, and determining whether the identification value of the packet matches an identification value in a header of a another packet that was received earlier. In some embodiments, the configurable processor 20 is also configured to check the first 64 bits in the header against the first 64 bits in another header of an earlier received packet to determine whether the packet is a duplicate packet. For TCP header, the first 64 bits include the source port, the destination port, and sequence number. For UDP header, the first 64 bits include the source port, the destination port, length, and checksum. In other embodiments, instead of the first 64 bits in the header, the configurable processor 20 may be configured to check other prescribed number (N) of bits (which may be more than 64 bits or less than 64 bits, for examples) in the header to determine whether the packet is a duplicate packet. The prescribed number N may be any value that is greater than zero.

In one implementation, the configurable processor 20 is configured to check different fields in the header against corresponding fields in another header of an earlier received packet according to a pre-determined field-checking hierarchy, which prescribes the following order for checking the fields in the header: IPID, first 64 bits (or other number of bits) in the header, source IP address, destination IP address, and fragment offset. In another implementation, the pre-determined field-checking hierarchy may prescribe the following order for checking the fields in the header: IPID, source IP address, and fragment offset. In other embodiments, the configurable processor 20 may be configured to check additional fields from the header. Also, in other embodiments, the order for checking the above items may be different as long as one of the fields with a higher change rate is checked before another one of the fields with a lower change rate. For example, in other embodiments, the order of checking may be as follows: the first 64 bits (or other number of bits) in the header, IPID, source IP address, destination IP address, and fragment offset. Also, in further embodiments, any combination of the above items may be checked simultaneously. In addition, in any of the embodiments described herein, the fragment offset may not need to be checked in order to identify a duplicate packet, and thus, the act of checking the fragment offset may not need to be performed.

In one or more of the embodiments described herein, the configurable processor 20 on the transceiver 10 may be configured to check the packet against an earlier packet that was received within a prescribed time window (period). In such cases, the packet is determined by the configurable processor 20 to be a duplicate packet when certain field(s) in its header matches with corresponding field(s) in the header of another packet (an earlier received packet), and when the packet and the earlier packet are received within a prescribed time period. Determining whether two packets are received within a prescribed time period to identify duplicate packet is advantageous because sometimes a node may intentionally transmit two identical packets at two different respective times. Intentionally transmission of two identical packets from a node is different from the situation in which packets are unintentionally copied during a network transmission or monitoring process. In particular, since duplicate packets that are unintentionally generated in the network transmission process occur very close in time from the original packet time (as opposed to a node that intentionally transmitting two identical packets, which occurs in respective times that are relatively further apart), the amount of time that is lapsed between reception of the two packets may be used to distinguish the two different scenarios. In particular, the configurable processor 20 operates on the assumption that if the two packets (with the same values in certain header fields) are received within the prescribed time period, then one of the packets is a duplicate packet generated during the network transmission process (and it is not resulted from a node sending a same packet twice). The prescribed time period may be any value set by a user. For example, in some embodiments, the prescribed time period may be 100 milliseconds or less, and more preferably, 80 milliseconds or less. The prescribed time period may have other values in other embodiments.

In other embodiments, instead of, or in addition to, performing packet de-duplication, the configurable processor 20 at the transceiver 10 may be configured to perform other packet processing functions, as described herein.

Figure 3B:
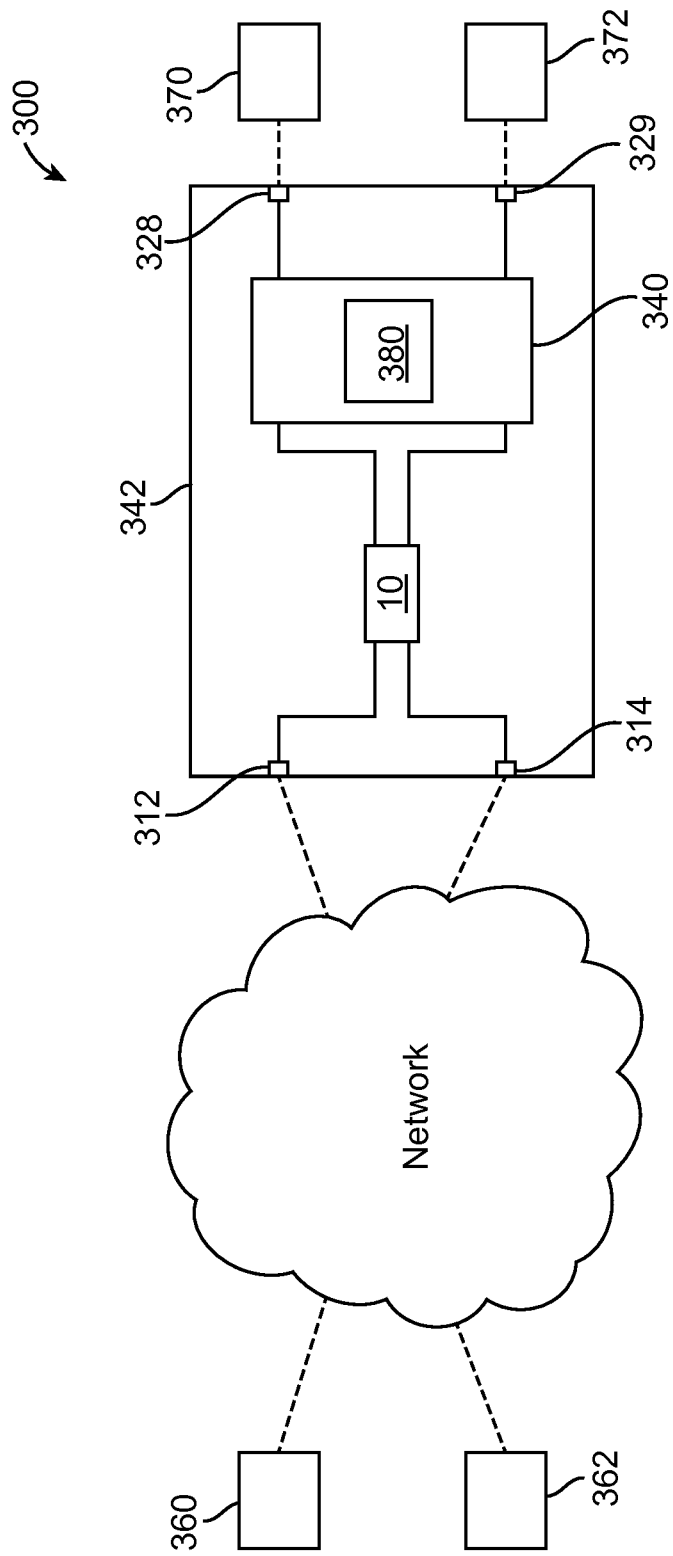
FIG. 3B illustrates a packet switch device in accordance with other embodiments.

In the above embodiments, the network switch device 300 has been described as having respective transceivers 10 for respective ports 312, 314. In other embodiments, the transceiver 10 may include multiple optical ports 16 for optically coupling to respective network ports at the network switch device 300 (FIG. 3B). In such cases, the transceiver 10 also includes multiple output ports 22 for electrically coupling to respective conductors at the network switch device 300.

Figure 4:
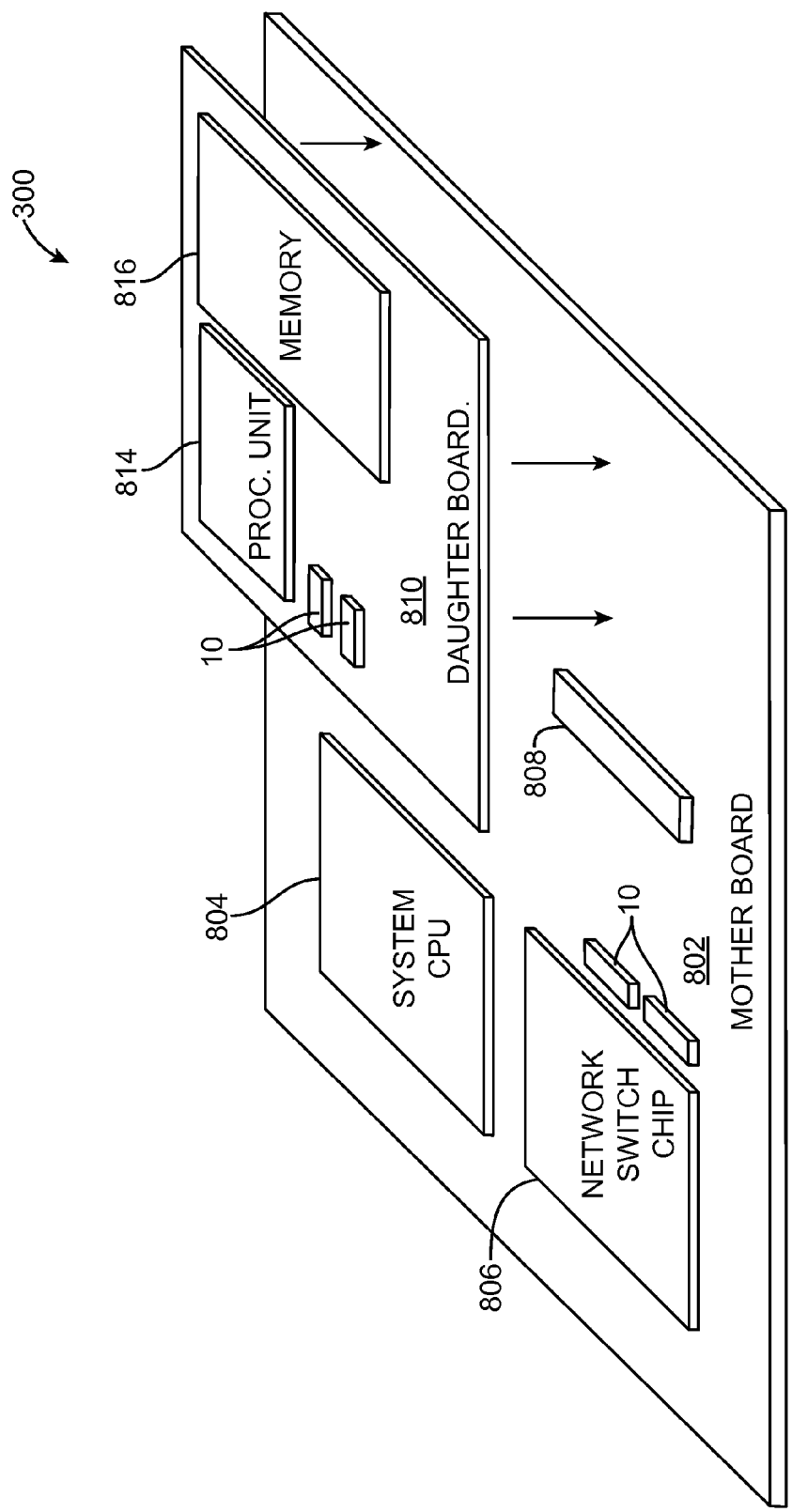
FIG. 4 illustrates an example of an implementation of the packet switch of FIG. 3A or FIG. 3B in accordance with some embodiments.

FIG. 4 illustrates an example of an implementation of the network switch device 300 of FIG. 3 in accordance with some embodiments. In the illustrated embodiments, the network switch device 300 includes a motherboard 802, which is the central or primary circuit board for the network switch device 300. The motherboard 802 includes a system CPU (central processing unit) 804, a network switch chip 806, and a connector 808. The CPU 804 is configured to interpret programming instructions and processes data, among other functions. The network switch chip 806, also referred to as an "Ethernet switch chip" or a "switch on-a-chip", provides packet switching and filtering capability in an integrated circuit chip or microchip design. The connector 808 provides the motherboard 802 with the capacity to removably accept peripheral devices or additional boards or cards. In some embodiments, the connector 808 allows a device, such as a daughter or expansion board, to directly connect to the circuitry of the motherboard 802. The motherboard 802 may also include numerous other components, such as, but not limited to, volatile computer readable storage medium and/or non-volatile computer readable storage medium (both of which may be considered examples of non-transitory medium), display processors, and/or additional peripheral connectors. The packet switch device 300 may also be configured with one or more hardware ports or connectors for connecting servers, terminals, IP phones, network instruments, or other devices to the packet switch device 300.

The network switch chip 806 is provided with a plurality of ports and may also be provided with one or more filters. The ports may each be half-duplex or full-duplex. Each of the ports may be configured, either separately, or in combination, as a network port, an instrument port, a transport port, or a loop-back port. Network ports are configured for connection to and/or from the network. Instrument ports are configured for connection to and/or from a network instrument, such as a packet sniffer, intrusion detection system, or the like. Transport ports are configured for connection to and/or from another network switch ship, another switch device (appliance), or a processor unit.

In some embodiments, the network switch device 300 may include instructions stored on a computer readable medium for configuring single or dual port loop-back ports. The instructions may be executed on the CPU 804. Each loop-back port reduces the number of ports available to be configured as a network, instrument, or transport port by at least one.

Also, in some embodiments, each of the ports of the network switch chip 806 may be associated with one or more packet filters that drop or forward a packet based on a criterion.

As shown in the illustrated embodiments of FIG. 4, the packet switch device 300 may include a daughter board 810 configured to be removably connected to the motherboard 802 via the connector 808. The daughter board 810 may be connected parallel to or in the same plane as the motherboard 802, as shown. In the parallel configuration, the daughter board 810 may also be referred to as a mezzanine board. Alternatively, the daughter board 810 may be oriented perpendicularly to the plane of the motherboard 802, or it may be connected in a different orientation. The daughter board 810 provides, in addition to packet distribution capabilities, other packet processing capabilities. The daughter board 810 has a processor unit 814, and a memory 816. As with the motherboard 802, the daughter board 810 may also include numerous other components (like those discussed with reference to the motherboard 802). The processor unit 814 may be any integrated circuit capable of routing and processing packets, such as duplicate packet identification and packet deduplication described herein.

In some embodiments, the daughter board 810 may include one or more transceivers 10. In other embodiments, the motherboard 802 may include one or more transceivers 10. In further embodiments, both the motherboard 802, and the daughter board 810, may include respective transceiver(s) 10. In some embodiments, the processor unit 814 at the daughter board 810 may be the configurable processor 20 of the transceiver 10. Also, in some embodiments, part of the network switch chip 806 may include transceiver(s) 10. In such cases, some or all of the functionalities of the network switch chip 806 may be implemented using the transceiver(s) 10 at the mother board 810.

In some embodiments, the daughter board 810 may be used to implement the integrated circuit 380 for performing packet processing, such as any of the packet processing functionalities described herein. In other embodiments, the motherboard 802 may be used to implement the integrated circuit 380 for processing, such as any of the packet processing functionalities described herein. In further embodiments, both the motherboard 802 and the daughter board 810 may be used to implement the integrated circuit 380 for performing packet processing.

In other embodiments, the processing unit 814 and the memory 816 are parts of a blade server, parts of motherboard 802, or parts of a module in a network switch chip.

Figure 5:
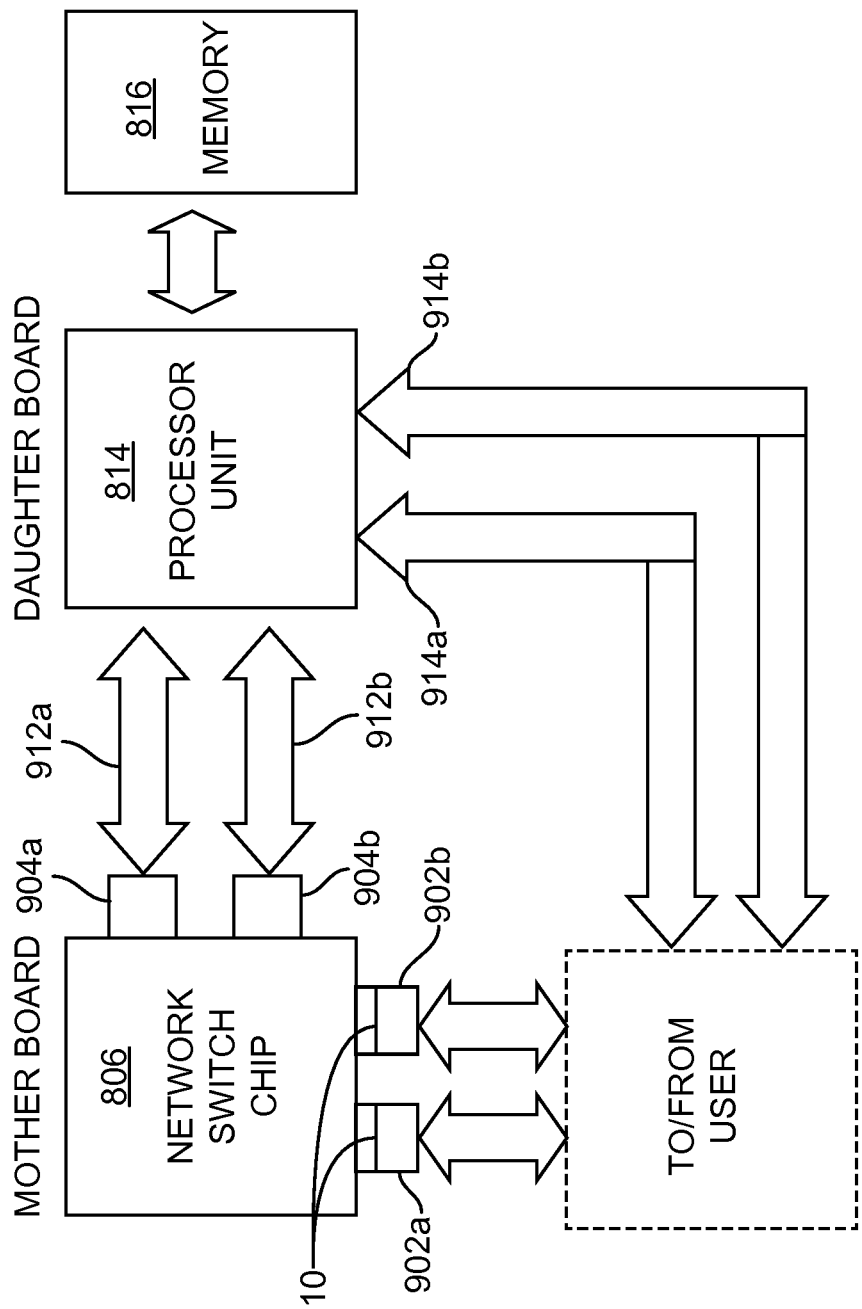
FIG. 5 illustrates an exemplary packet handling process by the packet switch device of FIG. 4 in accordance with some embodiments.

FIG. 5 illustrates logically an example of packet flow in the network switch device 300 of FIG. 4 in accordance with some embodiments. In some cases, a packet may be routed from an ingress port to an egress port that are both located on the network switch chip 806. Assume that port 902a is a network port on the network switch chip 806, that port 902b is an instrument port on the network switch chip 806, that ports 904a and 904b are transport ports on the network switch chip 806, and that connections 912a and 912b are connections between network switch chip 806 and the processor unit 814. Further assume that the packet switch device 300 is configured to route all packets from the network port 902a to the instrument port 902b. An ingress packet received at the network port 902a is processed by the transceiver 10 (which may perform time stamping on the packet, packet de-duplication, packet filtering, etc.), and the processed packet is routed to the transport port 904a for egress by the network switch chip 806. The packet is received by the processor unit 814 via the connection 912a. In other embodiments, the ingress packet is routed via the transport port 904b and received at connection 912b. The packet, after being processed by the processor unit 814, is routed back to the network switch chip 806 through connections 912a and transport port 904a, and may be processed by the transceiver 10 (or another transceiver 10) for egress at instrument port 902b. For example, in some embodiments, the transceiver 10 associated with the egress may be configured to remove part of the packet, or add information to the packet, before passing it to the instrument port 902b.

It should be noted that the packet switch device 300 is not limited to the configuration described previously, and that the packet switch device 300 may have different configurations in other embodiments. For example, in other embodiments, the device 300 may not have any daughter board. In such cases, any of the functions described herein may be performed by a processor or another integrated circuit, such as the processor 20 of the transceiver 10, that is located on the motherboard 802.

Figure 6:
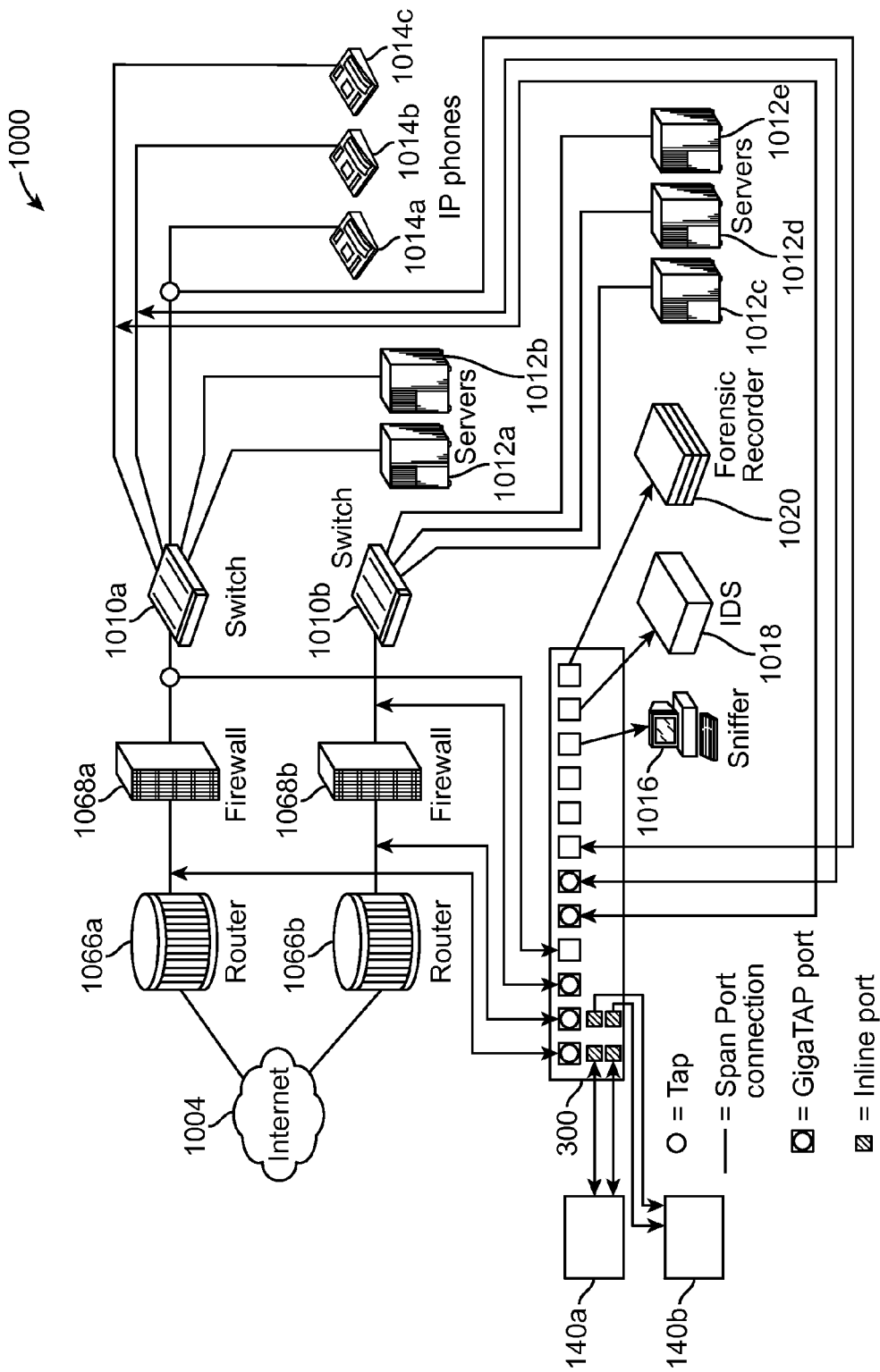
FIG. 6 shows an example of a deployment of the network switch device of FIG. 3A or FIG. 3B in a network environment in accordance with some embodiments.

FIG. 6 shows the deployment of the network switch device 300 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 300. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 300. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function.

Embodiments of the transceiver 10 described herein allows the network switch device 300 to be selectively reconfigured without changing the floorplan of the circuitry in the network switch device 300. For example, if a user wishes to add a functionality, remove a functionality, or change a functionality, of the network switch device 300, the user may configure (e.g., program) the configurable processor 20 on the transceiver 10 in the network switch device 300. In some embodiments, such may be accomplished remotely via the Internet. In other embodiments, the network switch device 300 may include a transceiver that does not have a configurable processor. In such cases, the existing transceiver in the network switch device 300 may be removed, and replaced with the transceiver 10 that includes the configurable processor 20, thereby allowing functionalities to be added to the network switch device 300. Such feature is possible because the transceiver 10 has a dimension that corresponds with that of an existing transceiver. In other embodiments, the dimensions of the transceiver 10 may be different from those of existing transceivers.

In some embodiments, when using the device 300, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 300, the device 300 can compare whether the IDS or the IPS sees more threats, and/or can have a redundant protection such that if the IPS misses any threat, the IDS may pick it up.

It should be noted that when a "packet" is described in this application, it should be understood that it may refer to the original packet that is transmitted from a node, or a copy of it.

Although the transceiver 10 has been described with reference to it being detachably coupled to a network switch device, in other embodiments, the transceiver 10 may be fixedly coupled to a network switch device. Also, in other embodiments, instead of a network switch device that includes instrument port(s), the transceiver 10 may be used with other types of devices, such as a network switch device that does not include any instrument port, any network transmission devices, or any communication device.

Although particular embodiments have been shown and described, it will be understood that they are not intended to limit the present inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A transceiver, comprising:
   an optical interface for detachably coupling to an optical transmission device;
   an optical-electrical conversion unit coupled to the optical interface;
   a programmable logic device communicatively coupled to the optical-electrical conversion unit, the programmable logic device including programmable logic; and
   an electrical interface communicatively coupled to the programmable logic device, wherein the electrical interface is configured for detachably coupling to a network switch appliance via an electrical transmission device;
   wherein the programmable logic device is configured to:
      receive user-specified program instructions; and
      reconfigure the programmable logic to perform packet processing according to the user-specified program instructions;
      wherein packet processing includes: packet filtering, packet slicing, time stamping, port labeling, packet masking, packet modification, packet stripping, packet de-duplication, or a combination thereof.

2. The transceiver of claim 1, further comprising:
   a diagnostic unit configured to detect a predetermined condition; and
   a port coupled to the diagnostic unit for reporting a detection of the predetermined condition.

3. The transceiver of claim 1, further comprising a first end and a second end, wherein the optical interface and the electrical interface are located at the first end, and the programmable logic device is located at the second end.

4. The transceiver of claim 1, wherein the programmable logic device comprises a clock recovery unit configured to determine time data for time stamping packets received at the transceiver.

5. The transceiver of claim 1, wherein the programmable logic device comprises a memory for storing information associated with a processing of packets received at the transceiver.

6. The transceiver of claim 1, further comprising a local clock unit for providing a reference clock signal.

7. The transceiver of claim 1, further comprising a power management unit coupled to the programmable logic device, wherein the power management is configured to deactivate the transceiver in response to a detected condition.

8. The transceiver of claim 1, further comprising a configuration port for configuring the programmable logic device.

9. The transceiver of claim 1, further comprising an input coupled to the programmable logic device for receiving a clock signal from an external clock.

10. The transceiver of claim 1, wherein the programmable logic device comprises a FPGA.

11. The transceiver of claim 1, wherein the programmable logic device comprises a CPLD or an EPLD.

12. A transceiver, comprising:
    an optical interface for detachably coupling to an optical transmission device;
    an optical-electrical conversion unit coupled to the optical interface;
    a configurable processor communicatively coupled to the optical-electrical conversion unit, the configurable processor including programmable logic; and
    an electrical interface communicatively coupled to the configurable processor, wherein the electrical interface is configured for detachably coupling to an electrical transmission device;
    wherein the configurable processor is configured to:
       receive program instructions; and
       reconfigure the programmable logic to perform packet processing according to the program instructions;
       wherein packet processing includes: packet filtering, packet slicing, time stamping, port labeling, packet masking, packet modification, packet stripping, packet de-duplication, or a combination thereof.

13. The transceiver of claim 12, further comprising:
    a diagnostic unit configured to detect a predetermined condition; and
    a port coupled to the diagnostic unit for reporting a detection of the predetermined condition.

14. The transceiver of claim 12, further comprising a first end and a second end, wherein the optical interface and the electrical interface are located at the first end, and the configurable processor is located at the second end.

15. The transceiver of claim 12, wherein the configurable processor comprises a clock recovery unit configured to determine time data for time stamping packets received at the transceiver.

16. The transceiver of claim 12, wherein the configurable processor comprises a memory for storing information associated with a processing of packets received at the transceiver.

17. The transceiver of claim 12, further comprising a local clock unit for providing a reference clock signal.

18. The transceiver of claim 12, further comprising a power management unit coupled to the configurable processor, wherein the power management is configured to deactivate the transceiver in response to a detected condition.

19. The transceiver of claim 12, further comprising a configuration port for configuring the configurable processor.

20. The transceiver of claim 12, further comprising an input coupled to the configurable processor for receiving a clock signal from an external clock.

21. The transceiver of claim 12, wherein the configurable processor comprises a FPGA.

22. The transceiver of claim 12, wherein the configurable processor comprises a programmable logic device.

* * * * *